Nov. 7, 1961  J. W. BAXTER  3,007,372
RECOVERABLE ROCKET LAUNCHING UNIT
Filed July 13, 1959  2 Sheets-Sheet 2

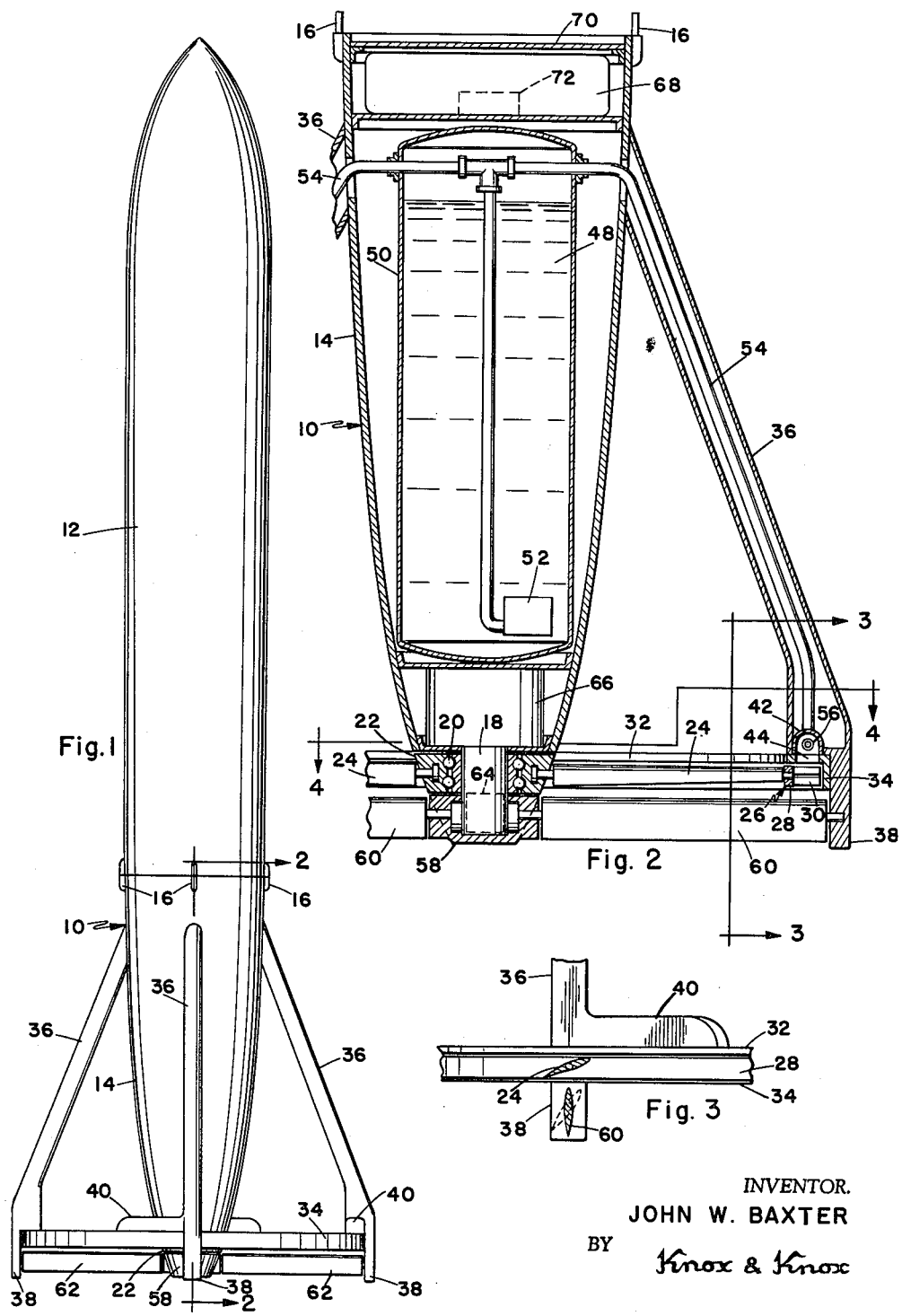

INVENTOR:
JOHN W. BAXTER
BY
Knox & Knox

United States Patent Office 3,007,372
Patented Nov. 7, 1961

3,007,372
RECOVERABLE ROCKET LAUNCHING UNIT
John W. Baxter, San Diego, Calif., assignor to
Ryan Aeronautical Co., San Diego, Calif.
Filed July 13, 1959, Ser. No. 826,674
2 Claims. (Cl. 89—1.7)

The present invention relates generally to rockets and missiles and more particularly to a recoverable rocket launching unit.

In the operation of a rocket powered vehicle, particularly a missile, the launching or take-off is extremely wasteful of fuel, a large amount of energy being required to lift and accelerate the rocket. Since the high velocity exhaust of a rocket is inefficient at the low speeds of the launching part of the flight, some means is required which is effective and economical of fuel at low speeds, yet has sufficient power to accelerate the rocket to a suitable speed for optimum utilization of the rocket thrust. It is well known that the high mass, low velocity flow from a propeller is a far more efficient means of propulsion at low speeds than a high velocity jet or rocket engine exhaust. However, on a basis of weight, a rocket provides far more power per pound of power unit weight than the usual reciprocating or turbine engine used to drive a propeller.

The primary object of this invention, therefore, is to provide a rocket launching unit which uses a propeller for initial and accelerating thrust, the propeller being driven by an integral turbine powered by rocket type power source.

Another object of this invention is to provide a rocket launching unit which is attached to the rear of a rocket propelled vehicle as a primary stage and is jettisoned when the rocket reaches a predetermined speed or altitude.

Still another object of this invention is to provide a rocket launching unit which incorporates complete directional control and stabilizing means for the initial part of the flight.

A further object of this invention is to provide a rocket launching unit which is recoverable for re-use, resulting in a great reduction in overall cost.

Finally, it is an object to provide a rocket launching unit of the aforementioned character which is simple, safe and convenient to operate and which will give generally efficient service under a wide range of operating conditions.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a side elevation view of a complete missile with the launching unit;

FIGURE 2 is an enlarged sectional view of the launching unit taken on the line 2—2 of FIGURE 1;

FIGURE 3 is a fragmentary sectional view taken on the line 3—3 of FIGURE 2;

Similar characters of reference indicate similar or identical elements and portions throughout the specification and throughout the views of the drawings.

Figure 4:
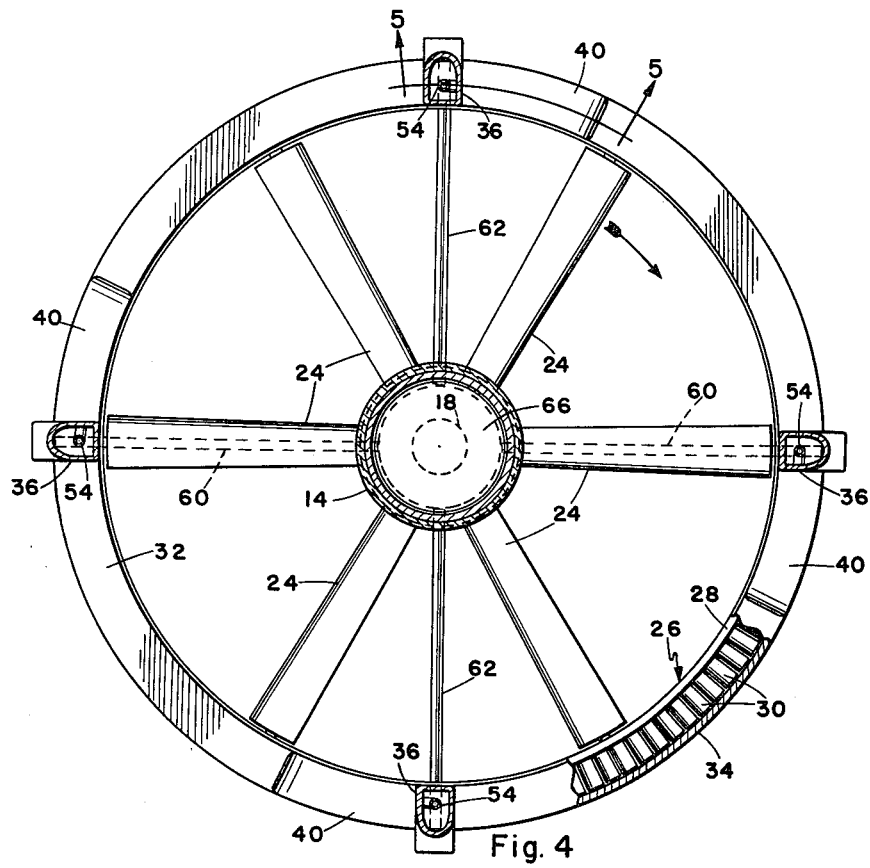
FIGURE 4 is a sectional view taken on the line 4—4 of FIGURE 2.

The launching unit 10 is fitted to the rear of a missile 12 of any conventional type which can be readily adapted for the purpose, the missile containing all the necessary propulsion and guidance equipment. The launching unit 10 has a body 14 which is an aerodynamic continuation of the missile 12 to minimize drag, the forward or upper end of the body being attached to the missile by any recognized connection means, such as explosive bolts indicated at 16. At the rear or lower end of the body 14 is an axially extending stub shaft 18 carrying a bearing 20 on which is mounted a freely rotatable propeller hub 22. Extending from the hub 22 are a plurality of propeller blades 24 attached at their outer ends to a turbine 26 having a mounting ring 28. Fixed around the entire circumference of the mounting ring 28 are radially outwardly extending turbine buckets 30. Above the turbine 26 is a shroud ring 32 having a downwardly extending outer flange 34 enclosing the outer periphery of the turbine, said shroud ring being supported by four fixed struts 36 extending angularly outwardly and downwardly from the upper portion of body 14. The lower ends of the struts 36 extend below the shroud ring 32 and serve as feet 38 on which the unit stands, the triangulated structure of the struts providing an extremely rigid support.

Figure 5:
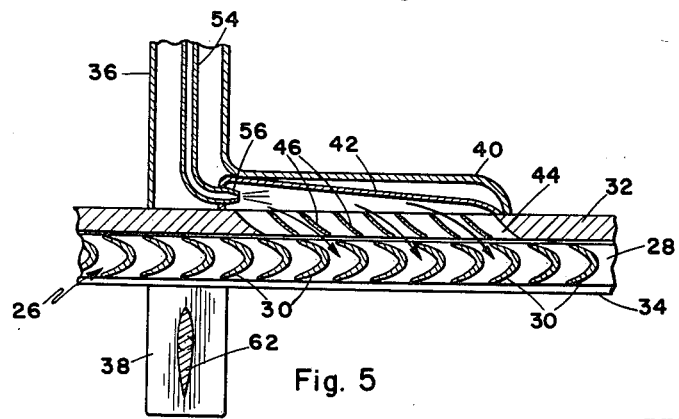
FIGURE 5 is an enlarged fragmentary sectional view taken on the line 5—5 of FIGURE 4.

Adjacent the lower end of each strut 36 is a horizontally projecting housing 40 extending along the upper surface of the shroud ring 32, and inside each housing is an elongated combustion chamber 42, communicating through an outlet slot 44 in the shroud ring to the turbine buckets 30, as in FIGURE 5. Each outlet slot 44 has a plurality of guide vanes 46 therein to guide the flow of gases to the turbine buckets 30 at the proper angle. The specific design of the turbine 26, combustion chambers 42 and guide vanes 46 is not critical and may be varied according to accepted practice.

As illustrated, the launching unit 10 is powered by a liquid fuel 48 stored in a suitable fuel tank 50 in the body 14. Fuel is supplied by a pump 52 and carried through fuel lines 54, inside the struts 36, to nozzles 56 in the combustion chambers 42. This particular fuel system is simple and effective but should not be considered limiting. For instance, the fuel tank 50 may be pressurized by inert gas instead of using a pump and the fuel may be a monopropellant, bi-propellant with individual tanks, or any conventional type fuel. Alternatively, a solid fuel may be used, either in a capsule in the body 14 or by utilizing the struts 36 themselves as rocket motor bodies. Where needed for a particular fuel, suitable ignition means of conventional type can be included. All of the mentioned fuel systems are well known in the rocket art and the particular source of high velocity gases to power the turbine is not a critical part of the present disclosure.

Below the propeller hub 22 is a fixed hub 58 secured on the end of the stub shaft 18 and pivotally mounted between said hub and the feet 38 are four control vanes arranged in opposed pairs 60 and 62, said control vanes being pivotal on axes normal to each other and to the longitudinal axis of the launching unit 10. The control vanes 60 and 62 are actuated by a conventional servomechanism 64 enclosed in the stub shaft 18, the servomechanism being controlled by a stabilizing unit 66 in the lower end of the body 14, the interconnection being conveniently made through said stub shaft. The servomechanism 64 is indicated diagrammatically and can be of any suitable type, such as fluid operated, mechanical, or electro-mechanical, depending on the power sources available. The stabilizing unit can be of any well known type such as a stable platform utilizing gyroscopes and accelerometers to detect deviation from the required trajectory and provide the necessary compensation by initiating an offset of thrust. In this instance, the control vanes 60 and 62 are used in pairs to deflect the propeller slipstream about two orthogonal axes to provide directional control corresponding to the normal pitch and yaw motions of conventional aircraft. Also, by differential operation of the control vanes, roll control about the longitudinal axis of the missile can be obtained. Since, the control vanes 60 and 62 are in the propeller slipstream at all times, their action is effective even at virtually zero speed at take off and throughout the low speed portion of the flight.

In missiles using only rocket power, the stabilizing action during the first stage of flight often requires large and constantly changing thrust corrections, the servo-mechanism necessary being complex and heavy. Often this mechanism is carried by the missile through the entire flight and is a considerable weight penalty. By incorporating the primary stabilizing mechanism in the launching unit, the system required for the more precise but less violent control of the missile in sustained flight can be greatly simplified, resulting in an increase in payload capability. Also the launching unit can carry the means to set or tilt the missile into a predetermined course by timed or command control, removing one more function from the missile itself.

As a further refinement, the launching unit 10 is intended to be recoverable for re-use. For recovery over water, the unit can descend utilizing the autorotation of the free propeller as a restraining or drag means. It is interesting to note that the empty fuel tank 50 serves as a very effective buoyancy chamber to hold the unit afloat for easy recovery. For recovery under any conditions, however, a parachute 68 is preferable and is packed in the upper portion of the body 14, said parachute being protected by a cover plate 70.

In operation, the launching unit 10 is started and conventional missile hold-down means may be used to restrain the missile until sufficient thrust is built up. The large mass air flow from the propeller blades 24, together with the residual thrust of the gases emerging from the turbine 26, lifts the missile and accelerates it to a considerable speed. The gyroscopic action of the rotating mass at the rear of the missile also has a stabilizing effect which is beneficial. When the acceleration of the launching unit is ineffectual, a release mechanism, indicated at 72, is actuated to separate the launching unit from the missile 12, after which the missile's own rocket engine can be fired to continue flight. The release mechanism 72 can be acceleration, velocity, or altitude sensitive according to the specific arrangement and launching requirements. When the launching unit 10 is sufficiently clear of the missile 12, the cover plate 70 is jettisoned and the parachute 68 is released by a suitable timing device incorporated in the release mechanism 72. Such timed release devices are well known in both rocket and ejection seat art and need not be described in detail. Since the launching unit 10 is effective in atmosphere only and at relatively low speeds, re-entry is not a problem and parachute recovery is normal.

It should be understood that all structure should be according to accepted standards, that shown being indicative only. If necessary, counter-rotating propellers may be used to eliminate torque and increase thrust to propeller disc area ratio, the propellers being of fixed or variable pitch type as required, and any number of struts and combustion chamber assemblies may be used. In addition, the propeller or propellers could be enclosed in a properly designed duct for increased efficiency, and the propeller drive means can be varied considerably within the ambit of this invention.

The launching unit provides a low cost rocket launching means which is easy to service and operate and can be used with a variety of missiles. A particular advantage of the system is that the launching area is not subjected to the high temperature blast of rocket exhaust normally encountered in missile launching and can thus be constructed in a more simple manner. This is especially advantageous in the launching of nuclear powered rockets, where it is essential to avoid radioactive contamination of the launching site, since the rocket will be at a considerable altitude before any radiation is released.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:
1. A rocket launcher, comprising: a self-contained launching unit including an elongated body having releasable coupling means at the forward end thereof for attachment to the rear of a rocket propelled vehicle; a propeller mounted at the rear of said body and freely rotatable about the longitudinal axis thereof; a turbine connected to the outer periphery of said propeller concentrically therewith; a shroud ring surrounding said turbine; a plurality of struts extending from said body to said shroud ring and supporting the shroud ring; a combustion chamber extending along said shroud ring from each of said struts; each of said combustion chambers having an outlet directed to said turbine; a source of fuel carried in said body and communicating with said combustion chambers through said struts; flow deflecting control vanes mounted adjacent the rear of said propeller; and stabilizing means in said body sensitive to deviations of the body from a predetermined alignment; said stabilizing means being directly and operatively connected to said control vanes to compensate for any sensed deviations.

2. A rocket launcher, comprising: a self-contained launching unit including an elongated body having releasable coupling means at the forward end thereof for attachment to the rear of a rocket propelled vehicle; a propeller mounted at the rear of said body and freely rotatable about the longitudinal axis thereof; a turbine connected to the outer periphery of said propeller concentrically therewith; a shroud ring surrounding said turbine; a plurality of struts extending from said body to said shroud ring and supporting the shroud ring; a combustion chamber extending along said shroud ring from each of said struts; each of said combustion chambers having an outlet directed to said turbine; a source of fuel carried in said body and communicating with said combustion chambers through said struts; flow deflecting control vanes mounted adjacent the rear of said propeller; and stabilizing means in said body sensitive to deviations of the body from a predetermined alignment; said stabilizing means being directly and operatively connected to said control vanes to compensate for any sensed deviations; said struts having integral feet extending substantially axially beyond said body and said propeller and constituting supports for the launching unit.

References Cited in the file of this patent
UNITED STATES PATENTS

| | | |
|---|---|---|
| 847,198 | Maul | Mar. 12, 1907 |
| 1,809,271 | Goddard | June 9, 1931 |
| 1,822,386 | Andersen | Sept. 8, 1931 |
| 2,686,473 | Vogel | Aug. 17, 1954 |
| 2,687,856 | Doman | Aug. 31, 1954 |
| 2,883,594 | Alberto | Apr. 21, 1959 |
| 2,899,149 | Brequet | Aug. 11, 1959 |